United States Patent

[11] 3,603,653

| [72] | Inventor | Arthur F. Hudson |
| | | 610 Indiana Bank Bldg., Huntington, Ind. 46802 |
| [21] | Appl. No. | 796,865 |
| [22] | Filed | Feb. 5, 1969 |
| [45] | Patented | Sept. 7, 1971 |

[54] BEARING ARRANGEMENT
5 Claims, 5 Drawing Figs.

[52] U.S. Cl. ............................................. 308/6 R
[51] Int. Cl. ................................................. F16c 29/06
[50] Field of Search ................................... 308/6 C, 6 B, 6; 74/25, 79

[56] References Cited
UNITED STATES PATENTS

| 3,043,634 | 7/1962 | Coley | 308/6 |
| 3,376,019 | 4/1968 | Weiss | 74/25 |
| 2,204,638 | 6/1940 | Weathers | 74/25 |
| 2,311,815 | 2/1943 | Briney, Jr. | 308/185 |
| 2,520,785 | 8/1950 | Schlicksupp | 308/6 C |
| 3,081,639 | 3/1963 | Hauptman | 308/6 C |

*Primary Examiner*—Martin P. Schwadron
*Assistant Examiner*—Frank Susko
*Attorney*—Jeffers & Young ABSTRACT: The present invention is concerned with a bearing arrangement in which contoured rollers are introduced into the space between concentric members. The rollers are disposed at an angle to the axis of the members and are contoured so as to have large ends rollingly engaging the inside surface of the outer member and reduced diameter central portions which rollingly engage the outer surface of the inner member. The rollers cause the members to rotate relatively while relatively reciprocating.

PATENTED SEP 7 1971   3,603,653

BEARING ARRANGEMENT

The present invention relates to bearing arrangements and is particularly concerned with a bearing arrangement for supporting concentric members in such a manner that the members will rotate relatively simultaneously with relative reciprocation thereof.

In my prior applications, Ser. No. 502,824, entitled "IMPROVED BEARING," filed Oct. 23, 1965, now U.S. Pat. No. 3,466,101, and Ser. No. 622,520, entitled "IMPROVED BEARING CONSTRUCTION," filed Mar. 13, 1967, now U.S. Pat. No. 3,469,893, there is shown a bearing element which is somewhat dumbbell shaped in that it has outwardly convex round end portions and an outwardly concave central portion. The bearing elements of the prior applications, referred to above, have been utilized to rollingly support members for obtaining simple relative motions therebetween.

In the present invention, a bearing element of the nature referred to is employed in such a manner as to obtain a more complex relative movement between the members and to control the relative movement so that the members occupy predetermined relative positions at all times.

In brief, the present invention proposes to insert bearing elements of the nature referred to between concentric members with the bearing elements arranged angularly to the axes of said members so that the members will be so guided relative to each other as to take simultaneous rotary and reciprocatory movement relative to each other.

A primary objective of the present invention is, therefore, to provide a novel bearing arrangement which will provide for a special type of relative movement between the parts supported by the bearing arrangement.

A particular object of the present invention is the provision of a novel bearing arrangement in which two concentric members supported thereby will take simultaneous rotary and reciprocatory motion relative to each other so that if one member is held stationary, the other will move so that a point thereon will follow a spiral path.

A still further object of the present invention is the provision of a bearing arrangement of the nature referred to above which is relatively inexpensive to construct.

Still another object of the present invention is the provision of a bearing arrangement of the nature referred to which can readily be incorporated in machine tools and the like for producing the type of motion referred to so that spiral surfaces for cams and the like can more readily be formed than has heretofore been possible.

The foregoing objects of the present invention, as well as still other objects and advantages thereof, will become more apparent upon reference to the following detailed specification taken in connection with the accompanying drawings in which.

Figure 1:
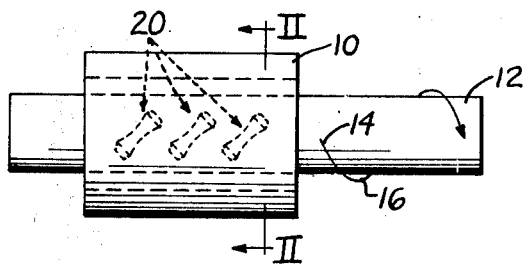
FIG. 1 is a somewhat schematic elevational view of a pair of members having a bearing arrangement according to the present invention and indicating the motion taken by one member relative to the other upon relative movement of the members.

Referring to the drawings somewhat more in detail, FIG. 1 shows a first member 10, which is indicated as being stationary. Member 10 is cylindrical, or sleevelike, and concentric therewith is a second member 12, which is in the form of a rod or shaft.

Interposed between members 10 and 12 is a bearing arrangement according to the present invention. The action obtained by the bearing arrangement is indicated by the arrow 14 which denotes the path taken by a point 16 on member 12. This motion can be described as simultaneous reciprocatory and rotary motion of members 10 and 12 relatively. Such motion is, of course, readily obtainable by the use of shaped grooves and like devices, but, according to the present invention, the said motion is obtained by a simple, but special, arrangement of relatively simple bearing elements in the space between said members and in frictional engagement with both said members.

Figure 3:
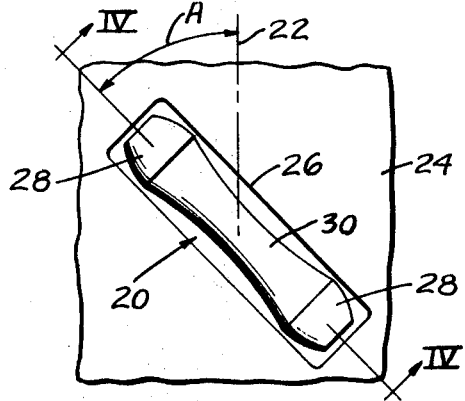
FIG. 3 is a developed view taken in the region indicated by line III—III on FIG. 2 and looking at bearing elements and a portion of the cage therefor from the side facing the outer member.
Figure 2:
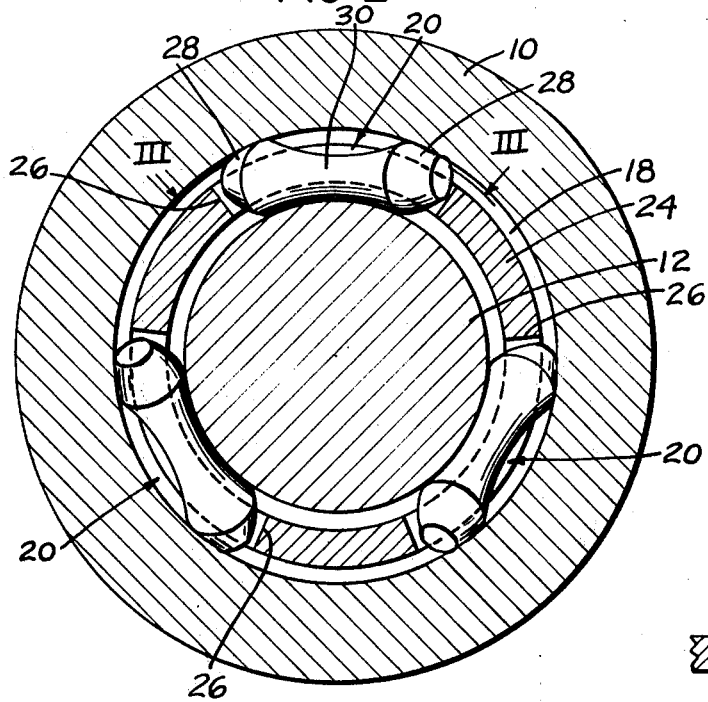
FIG. 2 is a cross-sectional view indicated by line II—II of FIG. 1, and showing the bearing elements disposed between two relatively moveable members.
Figure 4:
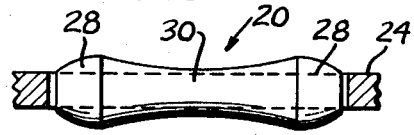
FIG. 4 is a sectional view indicated by line IV—IV on FIG. 3, showing a bearing element as it appears when viewed from the side thereof.

FIGS. 2 and 3 disclose more specifically the bearing arrangement of the present invention. In FIG. 2, it will be noted that there is an annular space 18 between the outer first member 10 and the inner second member 12. Disposed in annular space 18 are bearing elements 20. There is preferably a plurality of bearing elements spaced circumferentially of the members and, furthermore, there are preferably two or more of the bearing elements spaced longitudinally of the members in each of the circumferentially spaced regions. By distributing the bearing elements circumferentially and axially of members 10 and 12, the bearing elements can provide the full support of one member on the other thereof. As the description of the present invention proceeds, however, it will be apparent that other bearing devices could be provided for supporting the members relatively and the bearing elements according to the present invention employed only as motion controlling elements.

As will be seen in FIGS. 2 and 3, the bearing elements 20 are disposed angularly to the axis of members 10 and 12. In FIG. 3, this axis is indicated at 22 and it will be appreciated that the axis of each bearing element forms an included angle A with the axis 22 of members 10 and 12.

There is preferably provided a cage member 24 in the form of a sleeve in annular space 18, and which cage has holes 26 in which the bearing elements 20 are disposed. The particular cage arrangement forms no part of the present invention and is of more or less the conventional type employed in connection with antifriction bearings.

Each bearing element 20 has end portions 28 which are outwardly convex, and a central portion 30 which is of reduced diameter and which is outwardly concave.

The diameters of the end portions 28 and the central portion 30 are selected so that the bearing element must occupy an angular position between members 10 and 12 as shown in FIGS. 2 and 3. Furthermore, the curvature of the end parts 28 and of the central part 30 is selected so that a line contact of substantial extent will exist between the bearing elements and the inner and outer members. Thus, each end portion 28 will fit against the inner surface of the outer member and there will be line contact therebetween over a substantial portion of the length of each end portion 28. The end portions 28, on the sides thereof opposite the inner surface of the outer member, are spaced from the inner member.

With reference to the central portion 30 of each bearing element, these portions engage the inner member 12 with line contact which extends a substantial distance along the length of central portion 30 of each bearing element, while the sides of the portions 30 opposite inner member 12 are spaced from the outer member.

It will be apparent that the bearing elements will tend to roll about the inside of outer member 10 in a direction perpendicular to the length of the bearing elements.

Since the bearing elements roll about the inside of the outer member 10 along a spiral path, it follows that the concave central portion 30 of each bearing element will also follow a spiral path. Accordingly, the surface of inner member 12 which is engaged by the concave region of each bearing element will be driven in a spiral path.

Figure 5:
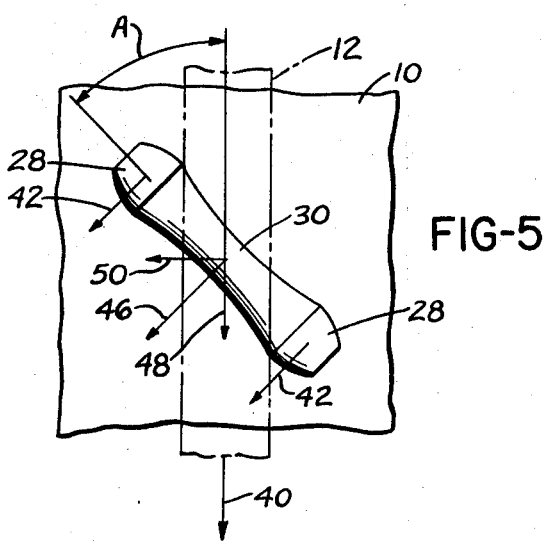
FIG. 5 is a somewhat diagrammatic view, showing the direction of movements which occur when one of the members moves relative to the other thereof.

The action described above is diagrammatically illustrated in FIG. 5 which shows the inside surface of outer member 10 developed and with a bearing element 20 according to the present invention resting thereon. The inner member 12 is shown in dot-dash outline engaging the concave central portion 30 of bearing element 20. The outer end portions of bearing element 20, in turn, rest on the inner surface of outer member 10. Movement of inner member 12 in the direction of its axis as indicated by arrow 40 will cause bearing element 20 to roll on the inner surface of member 10 in the direction indicated by arrow 42. This rolling motion of bearing element 20 will cause a point 44 of the concave central portion 30 which is in engagement with inner member 12 to follow the path indicated by arrow 46. This path is made up of a component 48 extending axially of member 12 and the same size as arrow 40, and a component 50 extending at right angles to component 48.

This last mentioned component imparts rotary movement to inner member 12. The size of component 50 relative to component 48, it will be seen, is a function of the angle A, previously referred to; and, specifically, the ratio of component 48 to component 50 is the tangent of angle A.

It will be appreciated that the particular size of angle A can be determined by calculating the diameters of the end portions 28 and of the central portion 50 to produce bearing contacts between the bearing elements and the inner and outer members in the desired angular position of the bearing elements. Once the bearing elements are inserted between the members at the proper angularity, they will be constrained to remain in that position of angularity because rotation to a different degree of angularity in one direction will be opposed by engagement of end portions 28 with the inside of the outer member, whereas rotation to different angularity in the opposite direction will be opposed by engagement of concave regions 30 with the outside of inner member 12.

It will be appreciated that, inasmuch as line contact is had between end portions 28 and the inside of outer member 10, the outer end portions of portions 28, while circular in cross section, are not circular in longitudinal cross sections.

Similarly, central portion 30 is circular in transverse cross section but when viewed in longitudinal cross section is not exactly circular on its opposite sides. In forming the bearing elements according to the present invention, a substantial portion of the end portions and of the central portion is made to have line contact with the respective inner and outer member while a certain part of each bearing element between the central portion and the end portions is in the form of a transition region which does not engage either of the said inner and outer members.

The number of the bearing elements needed would depend on the load to be carried thereby and the work to be done by the spiral movement of the one member. If other support bearings were employed for supporting the movable member, only enough of the bearing elements would have to be employed to drive the movable member along its spiral path. It will, therefore, be understood that it is within the purview of the present invention to use the specially shaped roller elements according to the invention merely as motion controlling elements having a minor bearing function, or as motion controlling elements having a major bearing function.

While inner member 12 has been shown as a solid rod or shaft, it will be understood that it could be sleevelike, if so desired, and in which case it could function as a receiver and support for the shanks of replaceable forming tools.

From the foregoing description, the elements 20 have been referred to as bearing elements, but it will be perceived that the term "roller elements," as employed in the appended claims, is also a proper designation, inasmuch as elements 20 can function as guiding elements, as well as bearing elements, can can also combine both functions, if so desired. In either case, the roller elements are closely fitted in the space between said members so as frictionally to engage both of said members. The frictional engagement referred to establishes the driving connection between the members necessary to control the direction of relative movement therebetween. Inasmuch as the roller elements roll on both of the members, however, the frictional engagement referred to does not interfere with the relative motion between the members in the direction determined by the roller elements.

It will be understood that the present invention is susceptible to modification to adapt it to different usages and customs and it is intended to include within the purview of the present invention such modifications and adaptations as may be considered to fall within the scope of the appended claims.

1. In combination; a first member having a cylindrical inner surface and a second member having a cylindrical outer surface, said members being coaxially arranged and having an annular space there between, and a plurality of roller elements disposed in said annular space and in frictional engagement with both of said members, the axis of said roller elements being disposed at an angle to a plane perpendicular to the common axis of said members whereby relative movement between said members will take the form of simultaneous relative rotary and linear motions, said roller elements being disposed in said annular space in circumferentially distributed relation and wherein each said roller element comprises enlarged diameter and portions convex in a radially outward direction and engaging the cylindrical surface of said first member, each said roller element also comprising a reduced diameter central portion which is concave in the radially outward direction and which engages the cylindrical surface of said second member.

2. The combination according to claim 1, which includes a sleevelike cage member in said annular space having holes therein in which said roller elements are disposed and in which said roller elements are captive.

3. The combination according to claim 1, in which a plurality of said roller elements are disposed in said annular space in circumferentially and axially distributed relation, and each said roller element comprises enlarged diameter end portions convex in a radially outward direction and engaging the surface of the base in said first member, each said roller element also comprising a reduced diameter central portion which is concave in the radially outward direction and which engages the cylindrical outer surface of said second member.

4. The combination according to claim 3, which includes a sleevelike cage member in said annular space having holes therein distributed circumferentially and axially thereof and each receiving therein one of said roller elements and retaining the respective roller element captive therein.

5. The combination according to claim 1 in which each end portion of each roller element and the central portion of each roller element engages its respective said member with line contact so as substantially to prevent slipping of said roller elements on eight of said members.

PO-1050
(5/69)

UNITED STATES PATENT OFFICE
CERTIFICATE OF CORRECTION

Patent No. 3,603,653  Dated September 7, 1971

Inventor(s) Arthur F. Hudson

It is certified that error appears in the above-identified patent and that said Letters Patent are hereby corrected as shown below:

Column 4, line 7, "can can" should be and can.

Claim 5, column 4, line 62, "eight" should be either.

Signed and sealed this 29th day of February 1972.

(SEAL)
Attest:

EDWARD M. FLETCHER, JR.
Attesting Officer

ROBERT GOTTSCHALK
Commissioner of Patents